United States Patent [19]

Arai et al.

[11] Patent Number: 4,737,855
[45] Date of Patent: Apr. 12, 1988

[54] AUTOMATIC DIAPHRAGM CONTROL DEVICE FOR TV CAMERA OBJECTIVE

[75] Inventors: Masayuki Arai; Terumi Ogasawara, both of Tokyo, Japan

[73] Assignee: Asahi Seimitsu Kabushiki Kaisha, Tokyo, Japan

[21] Appl. No.: 875,094

[22] Filed: Jun. 17, 1986

[30] Foreign Application Priority Data

Jul. 10, 1985 [JP] Japan ................................. 60-151630

[51] Int. Cl.$^4$ ............................................ H04N 5/238
[52] U.S. Cl. ................................................ 358/228
[58] Field of Search .................. 358/228, 169, 213.13, 358/213.19, 225

[56] References Cited

U.S. PATENT DOCUMENTS 4,409,472 10/1983 Kimura ................................ 358/228
4,427,996 1/1984 Tamura ............................... 358/228
4,609,944 9/1986 Nakada et al. ...................... 358/228

Primary Examiner—Jin F. Ng
Assistant Examiner—Stephen Brinich
Attorney, Agent, or Firm—Birch, Stewart, Kolasch & Birch

[57] ABSTRACT

An automatic diaphragm control device for a TV camera objective utilizing a video signal from the TV camera includes a circuit for adjustment of a low contrast video signal, a circuit for adjustment of a high contrast video signal and for preventing variations of the low contrast video output signal previously adjustment, a circuit for stabilization of a source voltage used as a power supply, a servo circuit for halting the operation of a servomotor driving said diaphragm in response to the adjusted video signals and a feedback signal from a detecting coil of the servomotor, and for driving the servomotor by supplying a stabilized driving voltage to a driving coil, and a circuit for activating operational amplifiers respectively associated with the adjustment and voltage stabilization circuits.

6 Claims, 3 Drawing Sheets

FIG. 4
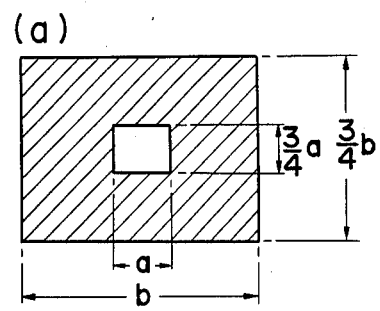
(a)
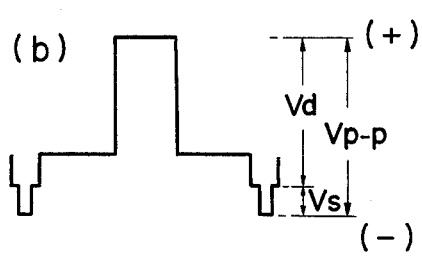
(b)
FIG. 5
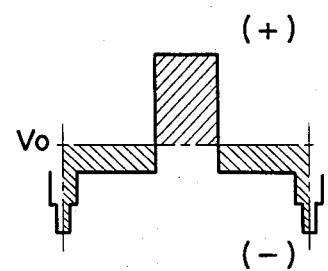
FIG. 6
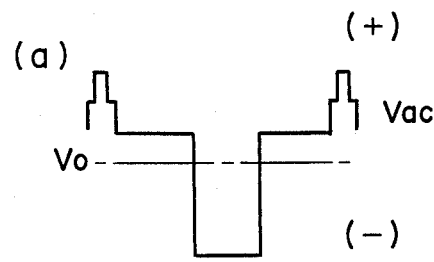
(a)
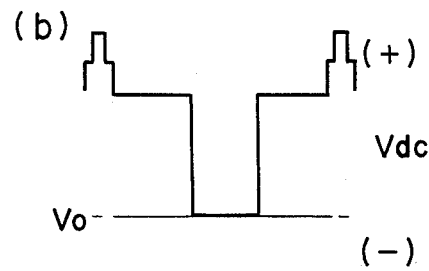
(b)
FIG. 7
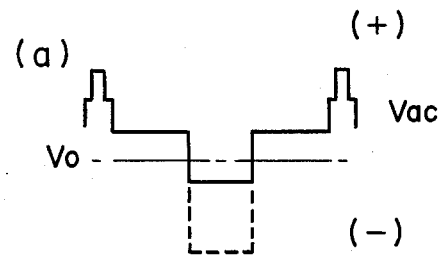

AUTOMATIC DIAPHRAGM CONTROL DEVICE FOR TV CAMERA OBJECTIVE

BACKGROUND OF THE INVENTION

1. Industrial field of application

The present invention relates to an automatic diaphragm control device for TV camera objective.

2. Prior art

As an automatic diaphragm control device for TV camera objective, a so-called one-way spring driven type has already been well known but has rarely been adopted in practice in view of its inconveniently limited range of useful driving voltage and poor reliability. A control device adapted for controllably driving the diaphragm in both directions, i.e., so as to open and close the diaphragm, respectively, has also been known and has been commonly employed, because the latter type provides a higher reliability and permits the consumed current to be effectively reduced.

However, demand for a more compact TV camera has recently increased and it has been found that the conventional control device of the bidirectional driving type cannot satisfactorily serve the objective of such a compact TV camra, since the conventional control device is too complicated in its structure to be correspondingly made compact.

3. Problems to be solved by the invention

A principal object of the present invention is, in view of the above-mentioned inconveniences, to provide an improved diaphragm control device of high reliability for a TV camera objective which includes a drive mechanism simplified and made compact by adopting the conventional one-way spring driven type while overcoming its inherent drawbacks, permitting both drive and control of the diaphragm to be achieved with a single power source, and leads to a reduction in current consumption.

SUMMARY OF THE INVENTION

Measures to solve the problems

To achieve the object as set forth above, the present invention provides an automatic diaphragm control device for a TV camera objective utilizing video signals from a TV camera, said automatic diaphragm control device comprising: first means primarily for adjustment of the video signals during a low contrast; second means primarily for adjustment of the video signals during a high contrast and also adapted to keep video output signals previously adjusted and set by the first means during the low contrast from any substantial variation; third means for stabilization of a source voltage in order to inhibit a possible variation of the video output signals preset by said first and second means or a possible increase of current; fourth means by which a braking can be effected on the basis of amplification of rectified signals provided by said first and second means and on the basis of a feedback signal from a detecting coil of a diaphragm driving servomotor, and, to drive the servomotor, for supplying the servomotor with a stabilized driving voltage substantially amplified in a one-way drive circuit having a voltage gain according to an obtained control signal; and fifth means to activate operational amplifiers respectively used in said first, second and fourth means with a single power source, and thereby realizing a highly reliable automatic diaphragm control device for TV camera objective having a variable photometric function, which is operable with a reduced current consumption and a compact structure.

Operation

It is well known that a video signal from a TV camera has an amplitude varying within a wide range depending upon a total brightness of an object to be shot and also upon a type of the TV camera used. According to the present invention, the first means adjusts the video output signals from the TV camera first on the basis of the overall brightness or the average brightness of the bright area and the dark area of the object during low contrast. More specifically, a level of the video output signal from the TV camera is greatly amplified when the level is low and slightly amplified when the level is high so that a constant output variation may be obtained. The second means is adapted to obtain a video signal based on the low contrast area by cutting the video signal portion corresponding to the bright area when the bright area and the dark area exhibit a high contrast in the object to be shot. Accordingly, even when the second means cuts the video signal portion corresponding to the bright area with respect to the object having a low contrast, the video signal previously adjusted and set by the first means during the low contrast is never varied by the second means because the video signal portion corresponding to the bright area has a relatively low level when the object is of a low contrast and cutting of this signal portion will not affect the overall video signal. Subsequently, the third means functions to stabilize the source voltage. In view of the fact that the video signal obtained by the first and second means, the diaphragm control signal obtained from this video signal and a diaphragm driving voltage depending upon said diaphragm control signal are all based on the source voltage, the source voltage serving the electric circuit of the device is kept by this third means at a constant level and thereby becomes highly reliable. The fourth means is adapted to effect a desired control on the basis of amplification of a rectified signal provided by said first and second means and on the basis of a feedback signal from a detecting coil of a diaphragm driving servomotor, and to drive the servomotor by supplying the servomotor with a stabilized driving voltage substantially amplified in a one-way drive circuit having a voltage gain according to an obtained control signal. Finally, the fifth means is adapted to provide a reference voltage in the first, second and fourth means as a mid-range voltage of the source voltage and thereby to activate said respective means with a single source voltage.

BRIEF DESCRIPTION OF THE DRAWINGS

FIG. 4 is a diagram illustrating a relationship between the object to be shot and the corresponding video signal;

FIG. 5 is a schematic diagram illustrating an input waveform before controlled by the means according to the present invention; and FIGS. 6 and 7 are schematic diagrams illustrating the control waveforms provided by the means according to the present invention.

DESCRIPTION OF THE PREFERRED EMBODIMENTS

Figure 1:
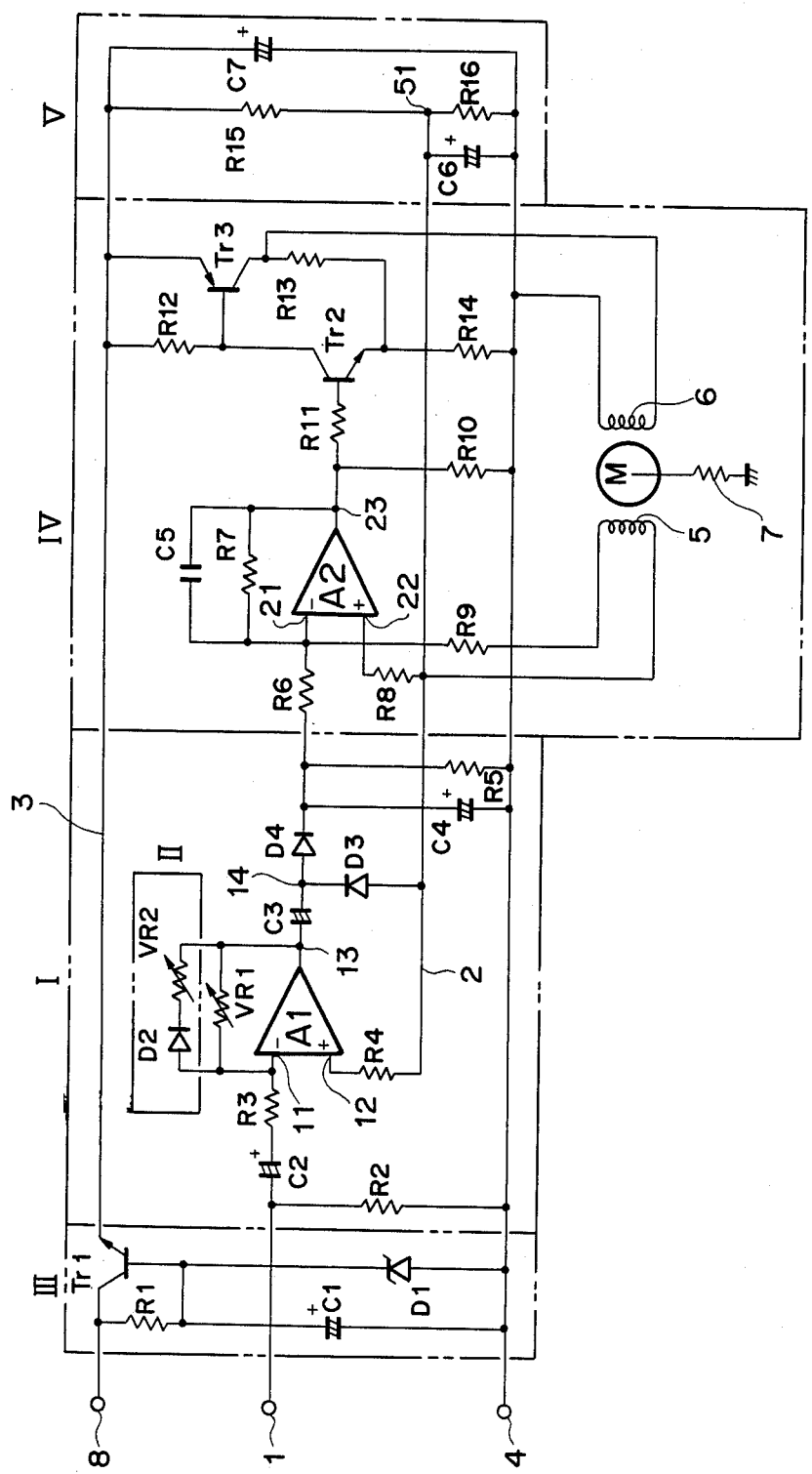
FIG. 1 is a circuit diagram illustrating one embodiment of the device according to the present invention.
Figure 2:
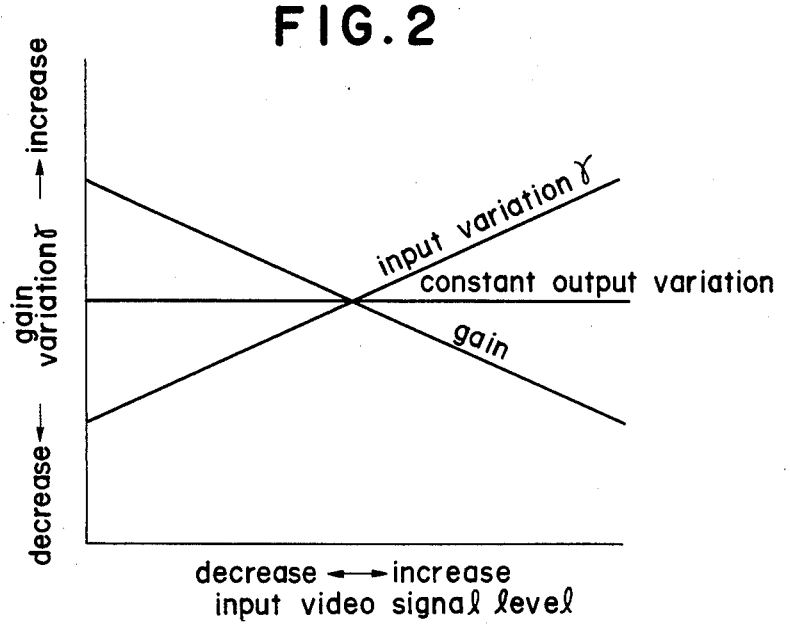
FIG. 2 is a functional diagram of the first means thereof.

The present invention will be now described more in detail with respect to embodiments as illustrated by the accompanying drawings. Referring to FIG. 1, reference numeral 1 designates an input terminal adapted to input a video signal Vin from a TV camera and connected to an inverted amplifier/rectifier I. In this circuit I, the input terminal 1 is connected through a resistor R2 to a ground side 4 and through a capacitor C2 and a resistor R3 to an inverted input terminal 11 of an operational amplifier A1 associated with the first and second means according to the present invention. A non-inverted input terminal 12 of the operational amplifier A1 is connected through a resistor R4 to a mid-range voltage terminal 2 described hereafter in detail and there is provided a variable resistor VR1 serving as a feedback resistor between the inverted input terminal 11 and an output terminal 13. Such circuit I is adapted to remove the DC component of the video signal Vin by said capacitor C2 and provides at the output terminal 13 an inversely amplified signal Vac, wherein said variable resistor VR1 may be adjusted for continuously changing a gain (amplification factor) of the operational amplifier A1. Thus, this circuit I constitutes the first means according to the present invention. Specifically, the gain increases as a resistance value of the variable resistor VR1 is increased and conversely decreases as said resistance value is reduced. This is illustrated by FIG. 2 in which an input variation $\gamma$ becomes large when an optimal video signal level for the camera is relatively high and the input video signal Vin is also high. In such a situation, the resistance value may be adjusted to a lower level so as to reduce the gain. For a small input variation $\gamma$ of the video signal Vin, on the contrary, the resistance value may be adjusted to a higher level to increase the gain and thereby obtain an inversely amplified signal Vac of a constant level. During this process, the input video signal Vin should be adjusted to have an amplitude in accordance with the overall brightness of the object to be shot, namely, the function of circuit I is principally to adjust the video output signal for objects of low contrast.

Figure 3:
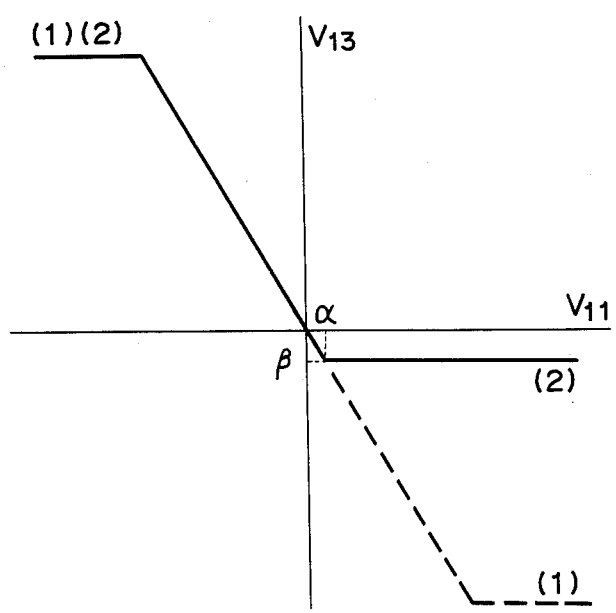
FIG. 3 is a functional diagram of the second means thereof.

Reference numeral II designates a limiter circuit adapted for continuous limitation of a negative side output (video signal output portion corresponding to a bright area in the overall object) of the video signal inversely amplified by said operational amplifier A1 and constitutes the second means according to the present invention. The limiter circuit II is provided in parallel to said variable resistor VR1 and comprises a diode D2 and a variable resistor VR2 adapted to control current flowing through said diode D2, in which the inverted input terminal 11 of the operational amplifier A1 is connected to an anode of the diode D2 while a cathode of the diode D2 is connected through the variable resistor VR2 to the output terminal 13. As shown by solid line(2) in FIG. 3, this limiter circuit II is adapted to obtain an input/output characteristic such that a negative side of the output voltage from the operational amplifier A1 is forcibly suppressed by the diode D1. Referring to FIG. 3, the abscissa indicates an input voltage V11 apearing at the inverted input terminal 11 of the operational amplifier A1 and the ordinate indicates an output voltage 13 appearing at the output terminal 13. As shown, the output voltage V13 is limited to a constant level of $\beta$ as the input voltage V11 exceeds a level of $\alpha$. It should be noted here that a broken line (1) corresponds to a characteristic which would be exhibited without any limitation.

The inverted signal Vac obtained in said inverted amplifier is then rectified by a voltage multiplying rectifier which is provided immediately subsequent to said inverter amplifier. In this voltage multiplying rectifier, a voltage multiplying capacitor C3 is connected to said output terminal 13, an output terminal 14 of said capacitor C3 is connected through a diode D3 to the midrange voltage terminal 2 to produce a voltage multiplied signal V14 corresponding to the inverted signal Vac containing both a positive side and a negative side, and a diode D4 is forwardly connected to said output terminal 14 so as to provide a rectified signal Vdc. There are provided a capacitor C and a resistor R5 between the voltage multiplying rectifier and ground for the purpose of smoothing said rectified signal Vdc.

Said rectified signal Vdc is coupled through a resistor R6 to an inverted input terminal 21 of an operational amplifier A2 constituting the fourth means according to the present invention adapted to provide a control signal for an automatic diaphragm controlling servomotor. There is provided between the inverted input terminal 21 and an output terminal 23 of the operational amplifier A2 a resistor R7 serving as a feedback resistor adapted to determine an amplification degree or factor in conjunction with said resistor R6. Reference C5 designates an integrating capacitor provided in parallel with the resistor R5. The input terminal 21 is also connected through a resistor R9 to an output terminal of a detecting coil 5 adapted to detect operation of the servomotor M for diaphragm control so that a feedback signal with which the servomotor M is stopped may be obtained. Another output terminal of said detecting coil 5 is connected to the mid-range voltage terminal. Additionally, a non-inverted input terminal 22 is connected through a resistor R8 to the mid-range voltage terminal 2 so that said rectified signal Vdc and the braking signal provided from the detecting coil 5 are compared with a mid-range voltage Vo as a reference voltage. As a result of such comparison, a difference relative to the mid-range voltage Vo appearing at the non-inverted input terminal 22 is relatively low and, in consequence, a control signal Vout appearing at the output terminal 23 is low when the signal appearing at the inverted input terminal 21 is relatively high while a difference relative to the mid-range voltage Vo appearing at the non-inverted input terminal 22 is relatively high and, in consequence, the control signal appearing at the output terminal 23 is high when the signal appearing at the inverted input terminal 21 is relatively low.

Said control signal is applied to an immediately subsequent one-way drive circuit having a voltage gain and thereby said diaphragm control servomotor M is driven with a substantially amplified driving voltage. A resistor R10 is inserted between the output terminal 23 of said operational amplifier A2 and the ground 4, and said output terminal 23 is also connected through a resistor R11 to the base of a transistor TR2. The collector of said transistor TR2 is connected through a resistor R12 to the positive terminal 3 of the source, and is also connected to the base of a transistor TR3 which is provided with said transistor TR2 as a pair. The emitter terminal of the transistor TR2 is connected through a resistor R14 to the ground 4, and it also connected through a feedback resistor 13 to the collector terminal of said transistor TR3. The emitter terminal of the transistor TR3 is connected to the positive terminal 3 of the source. Reference numeral 6 designates a driving coil of the one-way drive circuit associated with the servomotor M and this coil 6 is connected at one terminal with the collector of said transistor TR3 and at the other terminal connected to the ground 4 of the source circuit. Transistors TR2 and TR3 form a Darlington connection by which a voltage having an extremely high amplification factor is applied to the driving coil 6 in proportion to the control signal Vout applied to the base of the transistor TR2.

The diagphragm driving servomotor M is, in the embodiment shown, normally biased under action of a spring 7 to be rotated in the diaphragm closing direction while the driving coil 6 drives the servomotor M against said spring 7 in the diaphragm opening direction so that diaphragm control may be performed under a balance with the spring 7.

Reference numeral III designates a power supply circuit constituting the third means adapted to stabilize the source voltage for the device according to the present invention at a constant level. In this power supply circuit, the collector of a transistor TR1 is connected to a positive terminal 8 of the source and serially connected through a resistor R1 and a capacitor C1 to the ground terminal 4, a junction of said resistor R1 and said capacitor C1 is connected to the base of the transistor TR1 and said base is connected through a Zener diode D1 to the ground terminal 4 so that the base voltage may be kept constant independently of a voltage variation at the positive terminal 8 to supply the positive terminal 3 of the source corresponding to the emitter terminal of the transistor TR1 with constant voltage and current.

Reference numeral V designates a mid-range voltage supply circuit constituting the fifth means according to the present invention connected to said power supply circuit III. This circuit V is adapted to output an intermediate (preferably ½) of the stabilized source voltage to the mid-range voltage terminal 2. In the specific embodiment as shown, a smoothing capacitor C7 and serial resistors R15, R16 having the same resistance value are provided in parallel across the positive terminal 3 and the ground 4, and a junction point 51 of said resistors R15, R16 is connected to the mid-range voltage terminal 2 so that a voltage equal to ½ of the source voltage is output to the mid-range voltage terminal 2. Reference C6 designates a smoothing capacitor connected between the mid-range voltage terminal 2 and the ground 4.

The manner in which the device according to the present invention operates will now be considered in reference to the embodiment of the above-mentioned arrangement. Assuming that the video signal Vin is input to the input terminal 1 with a waveform (b) as illustrated in the test chart (a) of FIG. 4, this waveform will have a positive rectangular area corresponding to the bright area of the scene of a video level Vd, a synchro level Vs and an amplitude Vp-p. Such a video signal Vin has its DC component removed by the capacitor C2 and, in consequence, the positive side area and the negative side area are biased with respect to the reference voltage Vo, as seen in FIG. 5. This signal is then inversely amplified by the operational amplifier A1, as seen in FIG. 6 (a), on the basis of the mid-ranged voltage Vo applied from the mid-range voltage terminal 2 and appears at the output terminal 13 as Vac. The gain of this operational amplifier A1, namely, the amplification factor, depends on a ratio of the resistance value of the variable resistor VR1 to that of the resistor R3, so that it is possible to increase or decrease the gain and, therefore, the amplitude of the inverted signal Vac by regulation of the resistance value of said variable resistor VR1. Thus, the first means according to the present invention is implemented for appropriate adjustment of the video signal during the low contrast.

Now in the limiter circuit II, the variable resistor VR2 may be regulated to limit the portion of the video signal corresponding to the bright area and thereby obtaining an object to be shot principally adjusted on the basis of the dark area during the high contrast. More specifically, the variable resistor VR2 may be first regulated so as to have an infinite resistance value to obtain the inverted signal Vac having a waveform similar to one illustrated in FIG. 6. When this inverted signal Vac is applied to the capacitor C3 of the voltage multiplying/rectifying circuit, the diode D3 becomes conductive with the negative side signal and thereupon the capacitor C3 is charged. The immediately following positive side signal is applied thereto and the multiplied voltage is DC rectified with its amplitude remaining unchanged, as illustrated in FIG. 7 (b), providing a control signal suitable for detection of the video level Vd of FIG. 4 (b) in order to adjust the object on the basis of the bright area therein. When the resistance value of the variable resistor VR2 is adjusted to 0, the diode D2 becomes conductive and the the limitation is effected as seen in FIG. 3 (2), so that the bright portion of the video signal Vin is cut as seen in FIG. 7 (a), resulting in the inverted signal Vac free form the portion indicated by broken line. This inverted signal Vac is rectified by the multiplied voltage signal and DC-regenerated as illustrated in FIG. 7 (b), as in the previous case. Here is provided the control signal suitable to adjust the object on the basis of the dark area therein corresponding to the video signal Vin with its bright portion having been cut. During the low contrast, the video output signal preset by the first means will be hardly affected by the limiter circuit even when the latter is activated, since the bright portion of the video signal Vin has a relatively small amplitude during this low contrast.

The rectified signal Vdc is applied to the inverted input terminal 21 of the operational amplifier A2 and compared with the mid-range voltage appearing at the non-inverted input terminal 22 to obtain the control signal Vout at the output terminal 23. Simultaneously the feedback signal also is applied from the detecting coil 5 of the servomotor M to the inverted input terminal 21 and, therefore, the control signal Vout contains also the braking signal for the servomotor M.

The control signal Vout is input to the one-way drive circuit having the voltage gain of the Darlington connection consisting of two transistors TR2, TR3 and it is thus possible to supply the driving coil 6 of the servomotor M with an extremely high driving voltage even when the control signal is of a relatively low level. More specifically, in proportion to a variation in the control signal Vout applied to the base of the transistor TR2, the voltage applied from the source terminal 3 to the collector of the transistor TR3 is amplified over a wide range. For example, assuming that the control signal Vout derived from the optimal video signal for a given object causes the driving coil 6 to maintain the diaphragm at a predetermined opening angle relative to the normal biasing of servomotor M in the diaphragm closing direction by force of the spring 7, there occurs no variation in the control signal Vout and the driving coil 6 continues to be supplied with a constant voltage from the source, so long as there occurs no change in the object condition. Upon occurrence of a change in the object condition, e.g., the object becomes brighter, the rectified signal Vdc increases, the above-mentioned comparison with the mid-range voltage in the operational amplifier A2 provides a lower voltage (control signal Vout) at the output terminal 23, the base voltage of the transistor TR2 in the one-way drive circuit decreases, the voltage applied to the driving coil 6 is reduced and the diaphragm is driven by the spring 7 in the closing direction, then the diaphragm is held at the subsequent condition of the optimal video signal. When the object becomes darker, reversely, the rectified signal Vdc decreases, the output signal (i.e. control signal) from the operational amplifier A2 increases, the voltage supplied to the driving coil 6 increases and the servomotor M is driven in the diaphragm opening direction against the action of the spring 7, then the diaphragm is held at the subsequent condition of the optimal video signal.

The source stabilizer circuit III serving as the third means according to the present invention now maintains the base voltage of the transistor TR1 by the resistor R1, the capacitor C1 and the Zener diode D1 so that the voltage applied from the power supply terminal 8 to the collector thereof may be constant at the emitter side of the source 3, the mid-range voltage of said first and second means according to the present invention may be kept constant, the source voltage of the Fourth means also may be kept constant, and thus the reliability thereof may be improved.

Finally, the mid-range voltage supply circuit serving as the fifth means according to the present invention supplies the mid-range voltage intermediate of said stabilized source voltage to the operational amplifiers A1, A2 associated with said first, second and fourth means so that the control voltage Vout based on such mid-range voltage may be obtained with a single source and the diaphragm controlling servomotor may be driven by amplifying this control voltage.

Effect

As obviously understood from the foregoing description, there is provided, in accordance with the present invention, an automatic diaphragm control device for a TV camera objective utilizing a video signal from a TV camera, said automatic diaphragm control device comprising the first means primarily for adjustment of the video signals during the the low contrast, the second means primarily for adjustment of the video signal during high contrast and also adapted to keep the video output signal previously adjusted and set by the first means during the low contrast against any substantial variation, the third means for stabilization of the source voltage in order to inhibit a possible variation of the video output signal preset by said first and second means or a possible increase of current, the fourth means by which braking of the servomotor can be effected on the basis of amplification of the rectified signal provided by said first and second means and on the basis of the feedback signal from the detecting coil of the diaphragm driving servomotor, and in order to drive the servomotor, supplying the servomotor with the stabilized voltage substantially amplified in the one-way drive circuit having a voltage gain according to the obtained control signal, and the fifth means to activate the operational amplifiers respectively used in said first, second and fourth means with a single power source. With such arrangement, a variable photometric function is provided, for example, it is possible to regulate the video signal coming from the TV camera on the basis of the overall brightness of the object to be shot and, during high contrast, the optimal video signal can be obtained by cutting the signal portion corresponding to the particularly bright area. Moreover, by stabilizing the source voltage and deriving the control signal based on the mid-range voltage intermediate of this stabilized source voltage, both driving and control of the diaphragm can be achieved with a single source. Furthermore, the source voltage can be amplified over an extremely wide range based on the control signal and then supplied via the one-way drive circuit to the servomotor in order to drive the diaphragm. Thus a highly reliable automatic control device of a TV camera objective is provided which can be easily made compact.

What is claimed is:

1. An automatic diaphragm control device for a TV camera objective comprising:
   first adjustment means for adjusting a low contrast video signal from said TV camera;
   second adjustment means for adjusting a high contrast video signal from said TV camera and for preventing a video signal adjusted by said first adjustment means from being substantially varied;
   voltage stabilization means for stabilizing a source voltage used as a power supply for said device, to prevent variations in the video signals adjusted by said first and second adjustment means;
   a servomotor for driving a diaphragm of said TV camera objective including a driving coil and a detecting coil;
   control means for halting the operation of said servomotor in response to said adjusted video signals and a feedback signal from said detecting coil, and for driving said servomotor by applying a stabilized voltage to said driving coil; and
   means for providing a voltage supply to said first and second adjustment means and said control means, which voltage supply is of a predetermined value that is less than said source voltage.

2. An automatic diaphragm control device for a TV camera objective according to claim 1, wherein said first adjustment means comprises an operational amplifier adapted to inversely amplify a DC component of the low contrast video signal in a gain-variable manner.

3. An automatic diaphragm control device for a TV camera objective according to claim 1, wherein said first adjustment means comprises an operational amplifier adapted to inversely amplify a DC component of the low contrast video signal in a gain-variable manner and said second adjustment means comprises a diode adapted to suppress a negative signal portion of an output signal from the operational amplifier serving as the first adjustment means.

4. An automatic diaphragm control device for a TV camera objective according to claim 1, wherein said voltage stabilization means comprises a transistor having a base voltage held at a constant level under action of a resistor, a capacitor and a Zener diode and outputs at its emitter a voltage supplied from a power supply terminal to its collector which is stabilized at a constant level;

wherein said constant voltage outputted at the emitter is supplied to the first and second adjustment means and the control means.

5. An automatic diaphragm control device for a TV camera objective according to claim 1, wherein the control means comprises an operational amplifier for amplifying a multiplied and rectified signal based on adjusted signals from the first and second adjustment means and said feedback signal from said detecting coil in order to provide a control signal, and a Darlington transistor connection consisting of two transistors for supplying said control signal to said driving coil as an extremely high driving voltage.

6. An automatic diaphragm control device for a TV camera objective according to claim 1, wherein the voltage supply means functions to supply operational amplifiers respectively used in the first and second adjustment means and control means with a mid-range voltage intermediate of said source voltage stabilized by the voltage stabilization means as a reference voltage so that both diaphragm driving and diaphragm control can be achieved with a single source.

* * * * *